United States Patent [19]

Bielagus

[11] Patent Number: 4,579,652
[45] Date of Patent: Apr. 1, 1986

[54] DISK SCREEN SHAFT ASSEMBLIES AND METHOD OF AND MEANS FOR MANUFACTURING THE SAME

[75] Inventor: Joseph B. Bielagus, Portland, Oreg.

[73] Assignee: Beloit Corporation, Beloit, Wis.

[21] Appl. No.: 546,443

[22] Filed: Oct. 28, 1983

[51] Int. Cl.⁴ .................... B23K 9/225; B23K 37/04
[52] U.S. Cl. ........................ 209/271; 228/48; 228/168; 228/175; 403/197; 403/272
[58] Field of Search ............... 228/48, 49 R, 4.1, 168, 228/169, 170, 182; 285/187, 416; 219/60 A, 125.1; 403/187, 197, 272; 209/271, 361

[56] References Cited

U.S. PATENT DOCUMENTS

| | | | |
|---|---|---|---|
| 1,282,959 | 10/1918 | Sears | 285/416 X |
| 2,442,446 | 6/1948 | Wallace | 29/157.3 |
| 2,448,694 | 9/1948 | Tyrner | 219/125.1 |
| 2,504,921 | 4/1950 | Carter | 228/49 A |
| 3,266,702 | 8/1966 | Parent et al. | 228/49 A X |
| 4,037,723 | 7/1977 | Wahl et al. | 209/104 |
| 4,118,848 | 10/1978 | Goldschmidt | 228/170 X |
| 4,218,006 | 8/1980 | Atrepiev et al. | 228/48 |
| 4,239,119 | 12/1980 | Kroell | 209/672 |
| 4,301,930 | 11/1981 | Smith | 209/671 |

Primary Examiner—Kenneth J. Ramsey
Attorney, Agent, or Firm—Hill, Van Santen, Steadman & Simpson

[57] ABSTRACT

Disk screen shaft assemblies have an array of concentric annular toothed disks mounted in axially spaced relation on and along shaft perimeters, with the inner diameters of the disks having bevelled edges welded to the shaft perimeters in a manner to confine the welding to the grooves defined by the bevelled edges with the shaft perimeters. Method and apparatus for mounting and welding the disks successively on the shaft perimeters attains accurate, warp free and effective mounting and welding of the disks to the shaft perimeters.

19 Claims, 13 Drawing Figures

FIG. 3
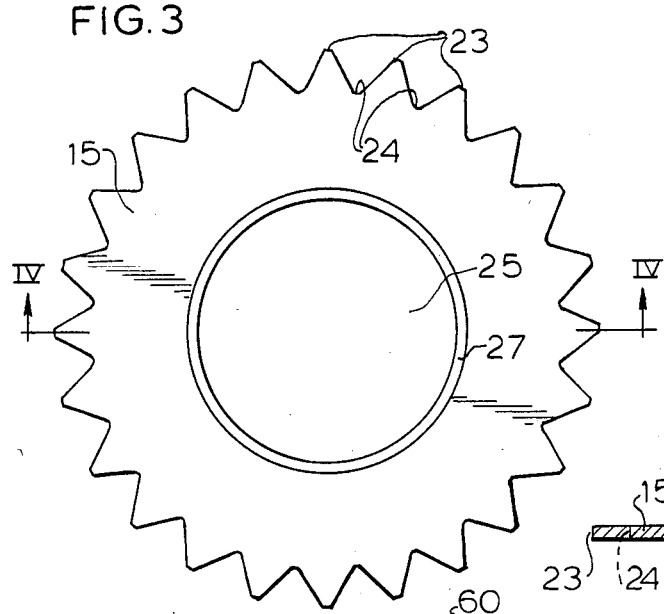
FIG. 6
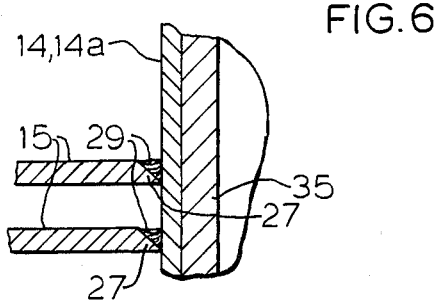
FIG. 4
FIG. 5
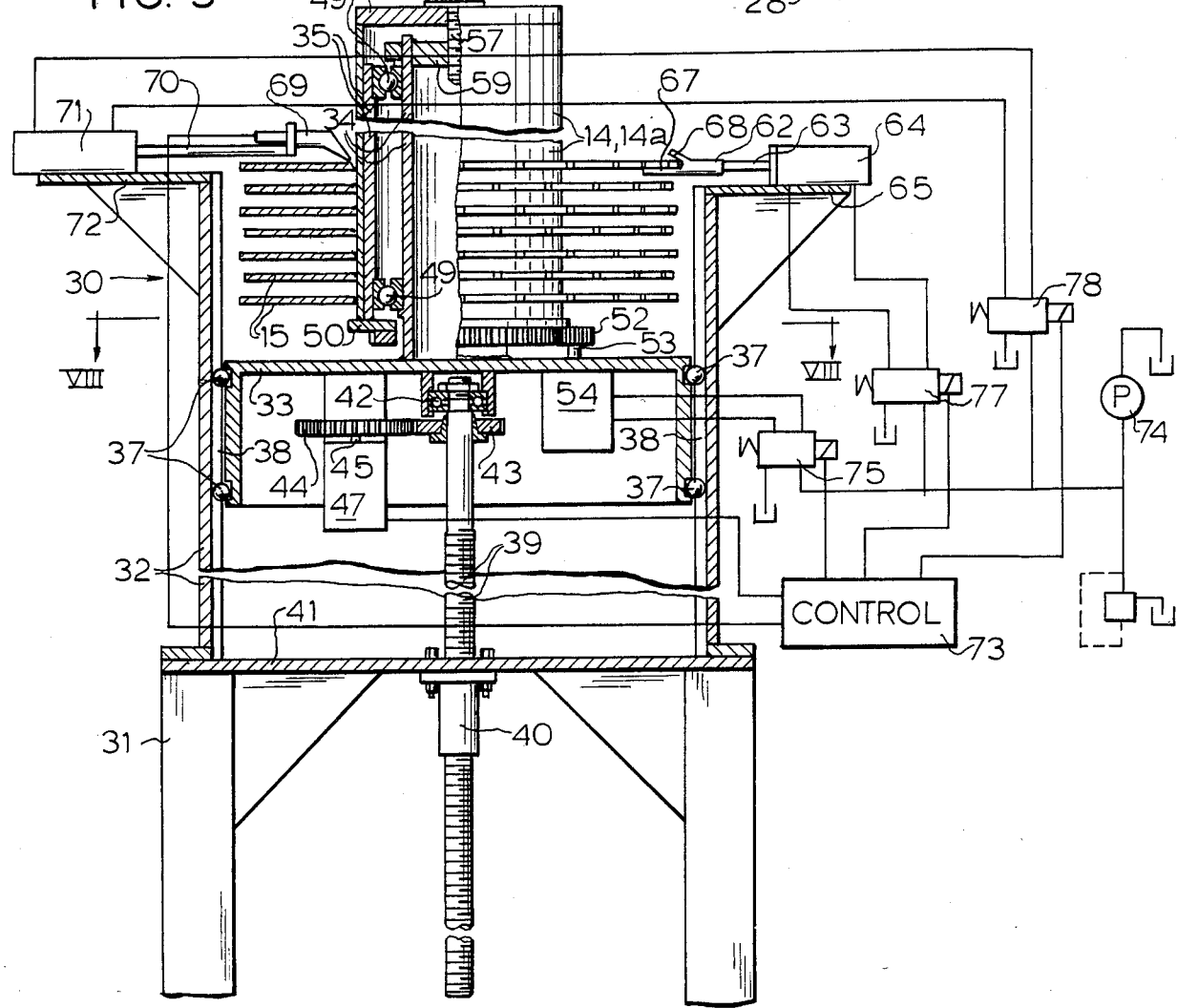

DISK SCREEN SHAFT ASSEMBLIES AND METHOD OF AND MEANS FOR MANUFACTURING THE SAME

This invention relates to disk screen shaft assemblies and method of and means for making the same, and is a substantial improvement upon the disk screen shaft assemblies disclosed in U.S. Pat. No. 4,301,930, which to any extent necessary is incorporated herein by reference.

As pointed out in the aforesaid patent, one of the problems with prior disk screens was that due to the large number of disks on any shaft, even slight variations in manufacturing tolerances were detrimental to slot widths from one side of the screen bed to the other side of the screen bed. According to prior practice, in order to attain fairly uniform slot widths, a tremendous amount of hand fitting was required. Such hand fitting was found to be unpredictable as to results, time consuming and expensive. The problem was aggravated where quite narrow slot widths were required. This problem was serious enough where the slot width defined by the disks was on the order of 10 mm. However, industry demands aggravated the problem by requiring narrower slot widths, such as 8 mm and 5 mm. The teaching of the aforesaid patent was an important step toward alleviation of the problem, and comprised welding the disks onto relatively short hubs and then mounting a series of the hubs on and along each rotary shaft in the screen bed.

While this has worked out reasonably satisfactorily, there has been experienced some difficulty with securing adequate strength at the weldment applied in the generally fillet arrangement between the hub and the square edge at the inner diameter of the disks. The weldment fillet interferes with close tolerance screening. If the weldment is of inadequate size, loosening of the disks from the hub is a hazard where the rotary screen disks are subject to unusual loading stresses such as where rocks or other hard foreign matter is encountered in operation.

A principal object of the present invention is to provide substantial improvements in the welded attachment of screen disks in assembly with the shaft means on which the disks are carried.

Another object of the invention is to provide a new and improved method of welding screen disks to the supporting shaft means.

A further object of the invention is to provide new and improved apparatus for efficiently assembling and welding screen disks to the supporting shaft means.

Accordingly, the present invention provides a disk screen shaft assembly having shaft means with a cylindrical perimeter and an array of concentric annular toothed disks mounted in axially spaced relation on and along said shaft means perimeter, and comprising said disks having axially facing surfaces and central shaft-receiving openings defined by annular bevelled edges engaged about said shaft means perimeter, said bevelled edges providing with said shaft means perimeter respective annular grooves; and welding securing said bevelled edges to said shaft means perimeter, and essentially confined to said grooves and free from said disk surfaces.

This invention also provides a method of making a disk screen shaft assembly having shaft means with a cylindrical perimeter and an array of concentric annular toothed disks mounted in axially spaced relation on and along said shaft means perimeter, comprising providing said disks with axially facing surfaces and central shaft-receiving openings defined by annular bevelled edges, mounting said disks in sequence on said shaft means by engaging said bevelled edges about said shaft means perimeter and defining with said shaft means perimeter and said bevelled edges respective annular grooves, and welding said bevelled edges of the disks to said shaft means perimeter and essentially confining said welding to said grooves free from said disk surfaces.

Also provided by the present invention is an apparatus for making a disk screen shaft assembly having shaft means with a cylindrical perimeter and an array of concentric annular toothed disks mounted in axially spaced relation on and along said shaft means perimeter, comprising means for supporting said shaft means in a position to receive said disks successively and with bevelled edges of the disks engaged about said shaft means perimeter and providing with said perimeter welding grooves, means for indexing the successive disks in spaced relation to one another along said shaft means perimeter, and means for welding said bevelled edges of the successive disks to said shaft means perimeter within said grooves.

Other objects, features and advantages of the present invention will be readily apparent from the following description of certain representative embodiments thereof, taken in conjunction with the accompanying drawings, although variations and modifications may be effected without departing from the spirit and scope of the novel concepts embodied in the disclosure and in which:

FIG. 3 is a plan view of a screen disk embodying the invention;

FIG. 4 is a diametric sectional detail view taken substantially along the line IV—IV of FIG. 3;

FIG. 5 is a schematic and fragmental vertical sectional elevational view of vertical disk screen shaft assembling and welding apparatus embodying the invention, taken substantially along the line V—V in FIG. 7;

FIG. 6 is an enlarged fragmentary sectional detail view taken substantially along the line VI—VI in FIG. 7;

Figure 1:
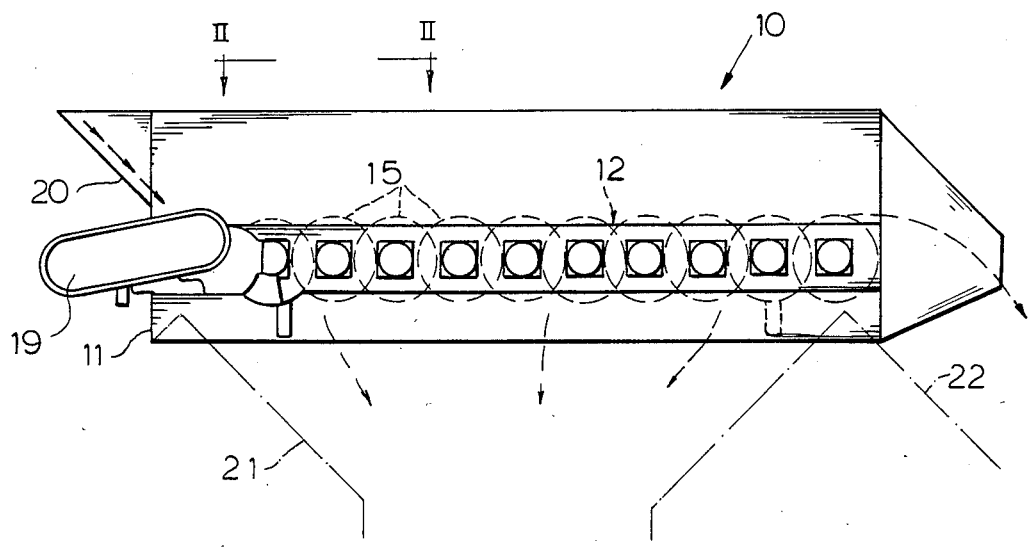
FIG. 1 is a side elevational schematic illustration of a disk screen apparatus adapted to use disk screen shaft assemblies embodying the present invention.
Figure 2:
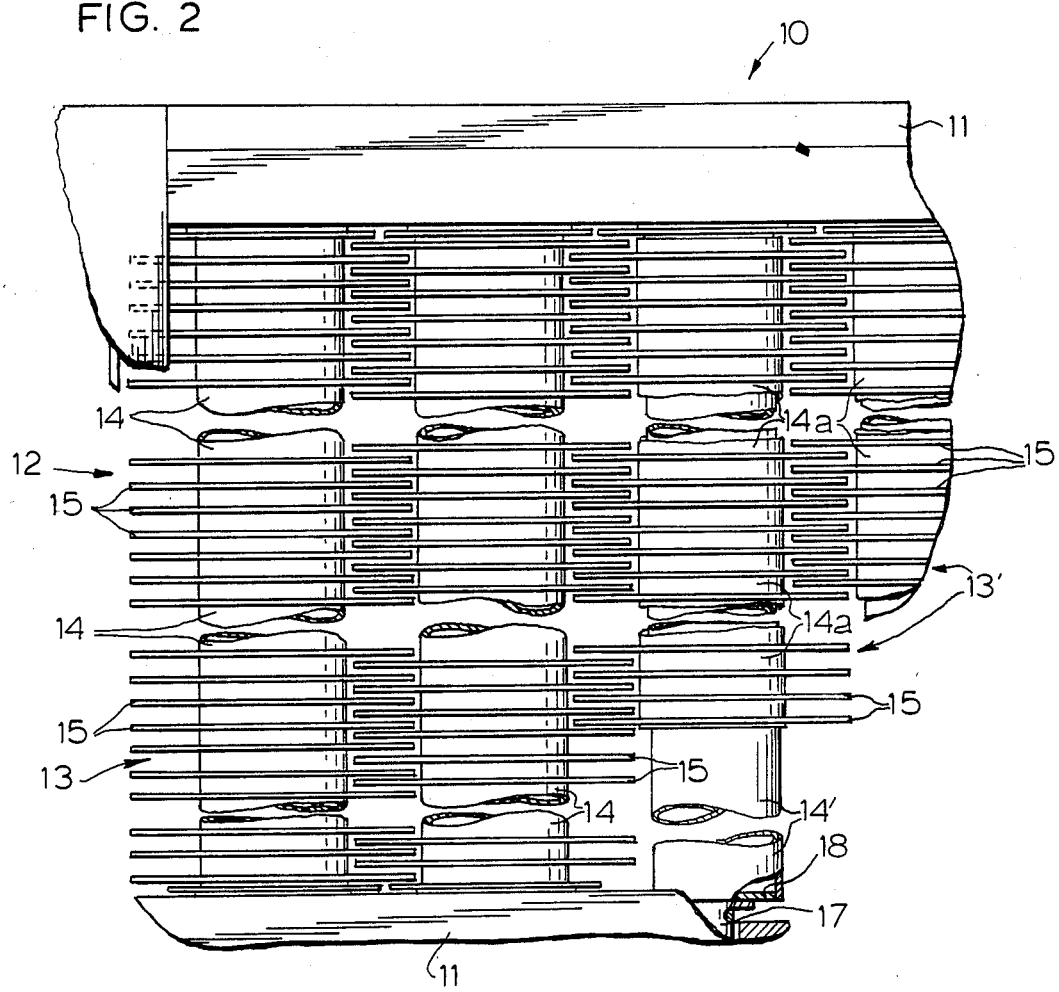
FIG. 2 is an enlarged fragmental top plan view of the screening bed of the apparatus taken substantially along the line II—II in FIG. 1.

Referring to FIGS. 1 and 2, a typical disk screen apparatus 10 comprises a frame 11 supporting a screening bed 12 having a series of corotating, spaced parallel disk screen shaft assemblies 13 or 13'. Each of the assemblies 13 includes a cylindrical perimeter shaft 14, and each of the assemblies 13' comprises a shaft 14', all of the shafts being desirably of hollow tubular construction. All of the shafts are of similar length and each carries a longitudinal series of concentric screen disks 15 which are related to interdigitate, as best seen in FIG. 2, with the screen disks of the adjacent shafts. Instead of the bed 12 comprising in part the assemblies 13 and in part the assemblies 13', the entire bed may alternatively comprise either of the assemblies. Whereas the assemblies 13 have the disks 15 carried directly by the shafts 14, the assemblies 13' have the disks 15 carried by cylindrical hubs 14a which are shorter than the shafts 14' and a plurality of the hubs 14a are mounted end-to-end corotatively on each of the shafts 14'.

At both of their opposite ends, the shafts 14 and 14' are equipped with suitable stub shafts 17 which are journalled on the frame 11, one of such stub shafts 17 being shown representatively in FIG. 2. In a desirable form, the stub shafts 17 are mounted concentrically on respective end disks 18 which may be welded into the ends of the shafts 14 and 14'. All of the shafts 14 and 14' are driven in unison in the same direction, clockwise as seen in FIG. 1, by a suitable drive means 19.

Material such as wood pulp slurry to be screened is delivered to the infeed end of the screening bed 12 by means of a chute 20, as indicated by directional arrows. The acceptable size wood pulp fiber particles drop with slurry water through the screening slots defined by and between the disks 15, and are received in a hopper 21. Wood particles, and other material too large to pass through the screening slots are advanced to and discharged, as indicated by directional arrows, from the rejects end of the screening bed 12, as by means of an outfeed chute 22. The screening function of the disks 15 is enhanced by a uniform generally saw-toothed configuration of the outer perimeters of the disks 15, provided by teeth 23 (FIG. 3) and intervening notches 24. Desirably, the teeth 23 are somewhat shorter than the extent of interdigitation of the disks. By virtue of the disks 15 all rotating in a common direction, efficient screening out of oversize matter and advancing of the oversize matter to the discharge end of the screening bed 12, are efficiently accomplished.

For maximum efficiency, all of the disks 15 must be as free as possible from any warpage, and must be as accurately as possible spaced one from the other on each of the disk screen shaft assemblies 13 and 13' so that the screening slots defined by and between the interdigitated disks will be accurate within a closely controlled tolerance requirement.

Each of the disks 15 is provided with a central shaft means receiving opening 25, and according to the present invention, such opening is defined by an annular bevelled edge 27 which, as best seen in FIGS. 4 and 6, extends from the plane of one axial face surface of the disk frustoconically to the plane of the opposite axial face surface of the disk. In a preferred construction, the bevelled inner edge 27 of each of the disks is formed on a 100° conical projection 28 (FIG. 4), as a result of which the bevel 27 extends at an angle of 50° relative to the axis of the disk as measured at any point along the bevelled edge circumference. This enables the disks 15 to be welded to the supporting shaft means free from disk warpage and with welding material 29 (FIG. 6) essentially confined to the reentrant angle annular groove defined by and between the bevelled edge 27 and the perimeter of the shaft means such as the shaft 14 or the perimeter of the hub 14a to which the minimum diameter of the bevelled edge approaches in a free sliding fit. As will be observed, through this arrangement, the welding material 29 can be readily controlled to avoid runover onto the face of the disk 15 at the larger diameter runout of the bevel 27. Further, by having the bevelled edge 27 extending the full width of the disk, a larger effective welded area of both the disk and the shaft 14 is engaged by the weld bond than is generally attained by a fillet weld for this type of disk screen shaft assembly and embodying the conventional square edge engagement of the disk with the shaft means.

Figure 7:
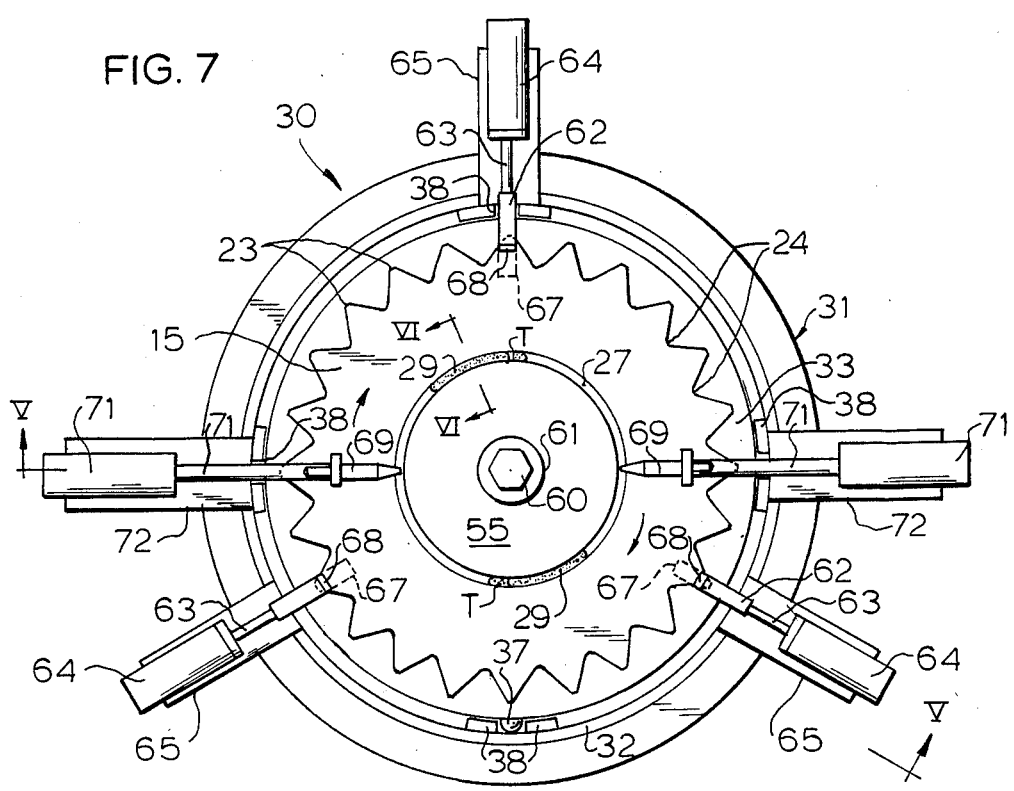
FIG. 7 is a top plan view of the apparatus shown in FIG. 5.
Figure 8:
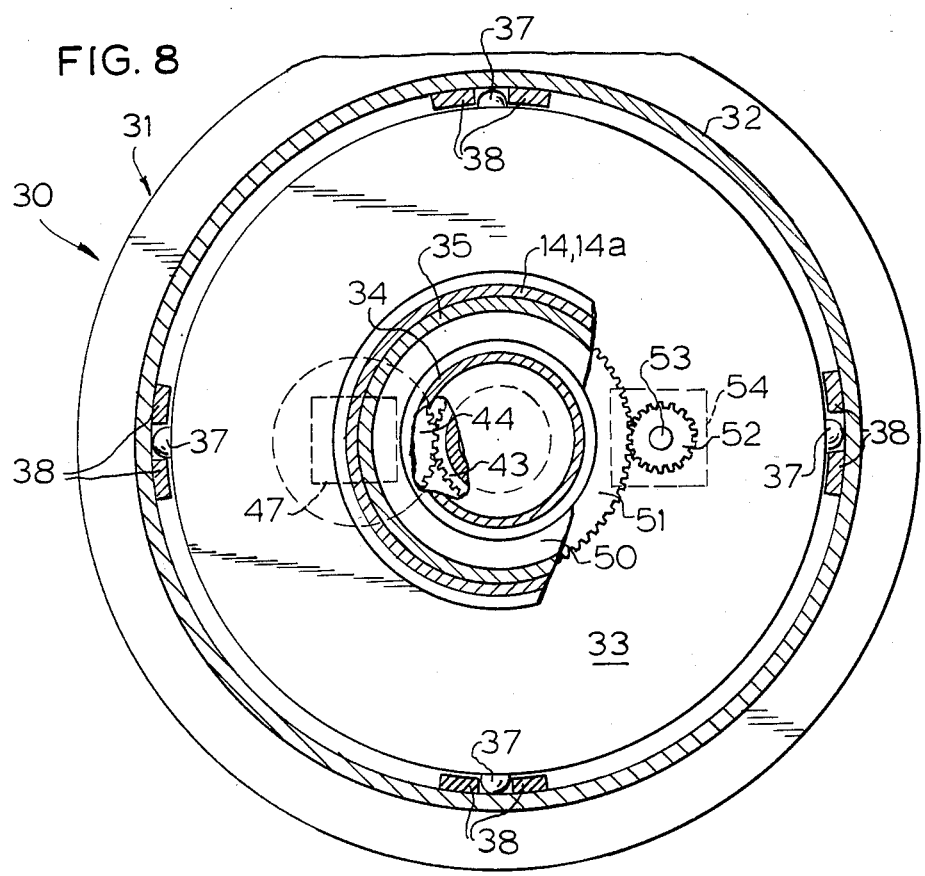
FIG. 8 is a horizontal sectional detail view taken substantially along the line VIII—VIII in FIG. 5.

Assembly of the disks 15 with the shafts 14, or the shaft means hubs 14a, is adapted to be effected accurately and efficiently by means of fixture apparatus 30 (FIGS. 5, 7 and 8). This apparatus comprises a stand 31 supporting a vertical guideway 32 for tracking a vertically displaceably platform 33 on which is fixedly centrally mounted a vertical post or hub 34 carrying a rotatable mandrel 35 on which one of the shafts 14, or one of the hubs 14a, is adapted to be carried corotatably. The arrangement is such that the shaft 14, or hub 14a, engaged with the mandrel 35 is adapted to be equipped progressively with a desired series of the disks 15, starting at the lower end of the shaft 14, or hub 14a, and progressing to the upper end thereof.

Incremental vertical adjustment of the mandrel 35 is adapted to be effected by controlled vertical shifting of the platform 33. To this end, the platform 33 is vertically tracked in the guideway 32 as by means of antifriction rollers or bearings 37 running in respective vertical tracks 38 on the guideway. Vertical shifting movement of the platform 33 is adapted to be effected by means of a ground ball screw 39 threadedly engaged in a fixed nut 40 carried by a head 41 on the stand 31. At its upper end, the screw 39 is connected to the underside of the platform 33 by means of a thrust bearing 42. For incremental rotation of the screw 39 for raising and lowering the platform 33, a pinion 43 keyed or locked to the screw 39 adjacently below the thrust bearing 42 meshes with a drive gear 44 mounted on a shaft 45 of a stepping motor 47 supported on the underside of the platform 33 as by means of a bracket 48. In this manner, the platform 33 is adapted to be incrementally lowered step-by-step from a maximum height starting position to receive the successive disks 15 at properly spaced intervals.

Rotary mounting of the mandrel 35 on the hub 34 may be effected by means of vertically spaced bearing assemblies 49. At its lower end, the mandrel 35 carries fixedly an annular ledge ring 50 which projects partially radially outwardly relative to the perimeter of the mandrel for supporting the lower end of the shaft means 14, 14a mounted on the mandrel. The annular member 50 also extends radially inwardly relative to the lower end of the mandrel 35 and supports on its underside a ring gear 51 which meshes with a driving pinion 52 on a shaft 53 projecting upwardly through the platform 33 from drive means comprising a fluid operated, e.g., hydraulic motor 54 carried by the underside of the platform 33. For retaining the shaft means 14, 14a corotative with the mandrel 35, means are provided comprising a thrust head plate 55 which engages the upper edge of the shaft means 14, 14a and clamps it onto the supporting shoulder provided by the ledge 50. A retaining bolt 57 extends through a central clearance hole 58 in the head plate 55 and is threaded into a beam 59 carried by the upper end portion of the post hub 34. Bolt head thrusts by means of an intervening antifriction thrust bearing 61 toward the head plate 55 and clamps it against the engaged end of the shaft means 14, 14a and thus clamps the lower end of the shaft means against the shoulder ledge 50. As thus mounted, the shaft means 14, 14a is adapted to have the disks 15 successively assembled therewith and welded thereto.

For supporting each successive disk 15 in proper horizontal assembly position relative to the shaft means 14, 14a, means are provided comprising a plurality, herein three, equally circumferentially spaced retractable supporting fingers 62 carried by respective piston rods 63 of fluid operated, e.g., hydraulic, cylinder actuators 64 mounted on respective brackets 65 carried by the outside of the upper end of the guideway member 32. Each of the fingers 62 projects radially inwardly toward the vertical axis of the mandrel 35 and has a radially inward digital disk supporting projection 67 and a radially inward and upward diagonal shorter hold down projection 68 which overlies the radially outer portion of the extension 67 and defines therewith a radially inwardly directed disk edge-engaging notch or crotch.

At diametrically opposite sides of the top of the guideway 32 are mounted respective welding heads 69 carried by respective piston rods 70 of respective fluid operated, e.g., hydraulic, cylinder actuators 71 mounted on respective brackets 72 at the outer side of the upper end of the guide member 32.

In operation, the mandrel 35 will support the shaft means 14, 14a initially indexed at the highest elevation wherein the first of the disks 15 which has been mounted about the shaft means 14, 14a and rests upon the supporting fingers 62 will be properly located for welding onto the shaft means. As thus located, the first disk 15 and each succeeding disk has the groove defined by the inner diameter edge bevel and the adjacent perimeter of the shaft means 14, 14a facing upwardly so that the welding heads 69 can function to deposit weld material downwardly into the groove onto the bevelled edge 27. Gravity will assure that the bevelled edge converging toward the shaft means perimeter will cam the fused welding material toward and into welding contact with the perimeter.

In order to assure accurate positioning of the disk 15 to be welded in assembly with the shaft means, the divergent extensions 67, 68 of the fingers 62 will engage the disk edge in respective ones of the notches 24 between adjacent teeth 23 of the disk. The disk will thus be held steady and accurately positioned for initiation of the welding in operation. The bevelled edge 27 of the disk is then tack welded, as indicated at T in FIG. 7, to the shaft means 14, 14a so as to be positively corotative with the shaft means upon rotary movement of the mandrel 35. After such tack welding, the supporting fingers 62 are backed off sufficiently to permit clearance of the disk teeth 23 past the finger extensions 68 while yet providing underlying slidable support for the disk by means of the digital extensions 67. The disk and shaft means assembly as tack welded together is then rotated while the welding heads 69 are operated to complete the first phase of final welding 29 of the bevelled edge 27 to the shaft means throughout predetermined arcuate segments, e.g., two to three inches, at diametrically opposite sides of the assembly. After the predetermined segments have been welded, the assembly is rotated as indicated by directional arrows in FIG. 7 to relocate the welding zones for final phase welding diametrically opposite segments 29, 90° spaced relative to the first applied welding segments 29.

After each of the disks 15 has been assembled with the shaft means and has been welded thereto, the welding heads 69 and the supporting fingers are backed off to clear the welded disk, and the fixture platform 33 is depressably indexed by a sufficient interval to bring the shaft means 14, 14a into proper position for receiving the next successive disk 15 in proper position for welding, and the welding cycle is repeated, step-by-step until all of the disks have been assembled and welded into the final assembly. The step-by-step vertical indexing of the platform 33 and thereby the mandrel 35 and the supported shaft means 14, 14a for each stage in the assembly and welding process, is effected by means of the stepping motor 47 driving the screw 39. Rotation of the mandrel 35 is effected by means of the hydraulic motor 54 in proper sequence in each assembling and welding cycle.

Automatic cyclical operation of all of the components of the apparatus 30 is desirably effected by suitable control means 73 which may be a digital or other control console which may have both manual and automatic capability. Electrical connections are provided between the controller 73 and the stepping motor 47 and the welding heads 69. For operating the hydraulic motor 54 and the hydraulic actuators 64 and 71, a hydraulic pump 74 is connected through a solenoid operated valve 75 with the motor 54, by means of a solenoid operated valve 77 with the hydraulic actuators 64, and by means of a solenoid operated control valve 78 with the welding head actuators 71. Solenoids for the valves 75, 77 and 78 are controlled by the controller 73 which, as is well known, may be equipped with suitable relays, switches and timers for manual and/or automatic operation of the system.

It may be noted that by having the minimum diameter of the bevelled edge 27 as close as practicable to the perimeter of the shaft means, and the bevelled edge 27 facing generally upwardly during the welding operation, the weld material is confined to the re-entrant groove defined between the bevelled edge and the adjacent perimeter area of the shaft means, and the weld material can be controlled not to flow onto the upwardly facing planar surface of the disk contiguous to the maximum diameter of the bevelled edge. Each of the welds 29, even though confined to the bevelled groove provides maximum weld strength because of the increased width of the disk edge by virtue of the bevel 27 and the axial weld area contact with the shaft means perimeter extending substantially the full disk thickness throughout the length of each of the welds 29. By welding at two limited areas 180° apart and then turning the assembly to weld at two like welds at 90° relative to the first welds, controls disk warpage to a bare minimum, if not entirely eliminated. Accuracy and production efficiency and speed are attained by the automatic programming of the assembling and welding cycles.

On reference to FIGS. 9–12, a fixture apparatus 80 is provided for accurately and efficiently assembling and welding the disks 15 on shafts 14 while supported in a horizontal mode. As shown, the arrangement 80 comprises a disk orienting and welding fixture 81 conveniently mounted in operative relation in association with a lathe 82 adapted for the purpose. Headstock 83 of the lathe carries chuck 84 by which the stub shaft 17 at one end of the shaft 14 is gripped corotatively for controlled rotation of the shaft 14 in the lathe. At the opposite end of the shaft 14, the stub shaft 17 is engaged by dead center 85 of tailstock 87 of the lathe.

Mounting of the fixture 81 to the lathe is by means of base structure 88 of the fixture secured to tracking carriage structure 89 slidably engageable with bed ways 90 of the lathe. An apron 91 depending from the carriage structure 89 at the front of the lathe 82 may carry customary means for traversing the fixture 81 along a lead screw 92. Rapid traverse is adapted to be effected by means of hand wheel 93. Controlled incremental advance of the carriage 81 is adapted to be effected by means such as a stepping motor 94 drivingly connected to the lead screw 92 as by means of a reduction timing belt drive 95, and which connection may typically provide a 5:1 reduction. Operation of the motor 94 is controlled by a programmable controller represented by the box 97 and provided with a control panel having an array of digitally operable control buttons 98.

A frame 99 of the fixture 81 is fixedly carried by the base 88 and is arranged to straddle the disk screen shaft assembly 13, with respect to which the fixture is adapted to be advanced by screen disk spaced intervals for each of the disks 15 as welding the disks to the shaft 14 progresses. At its advancing side, the frame 99 carries a mounting panel or plate 100 to which the various operating mechanisms of the fixture are mounted. A clearance aperture 101 through the plate 100 concentric with the shaft 14 is of a diameter to clear the disks 15 mounted on the shaft.

Figure 9:
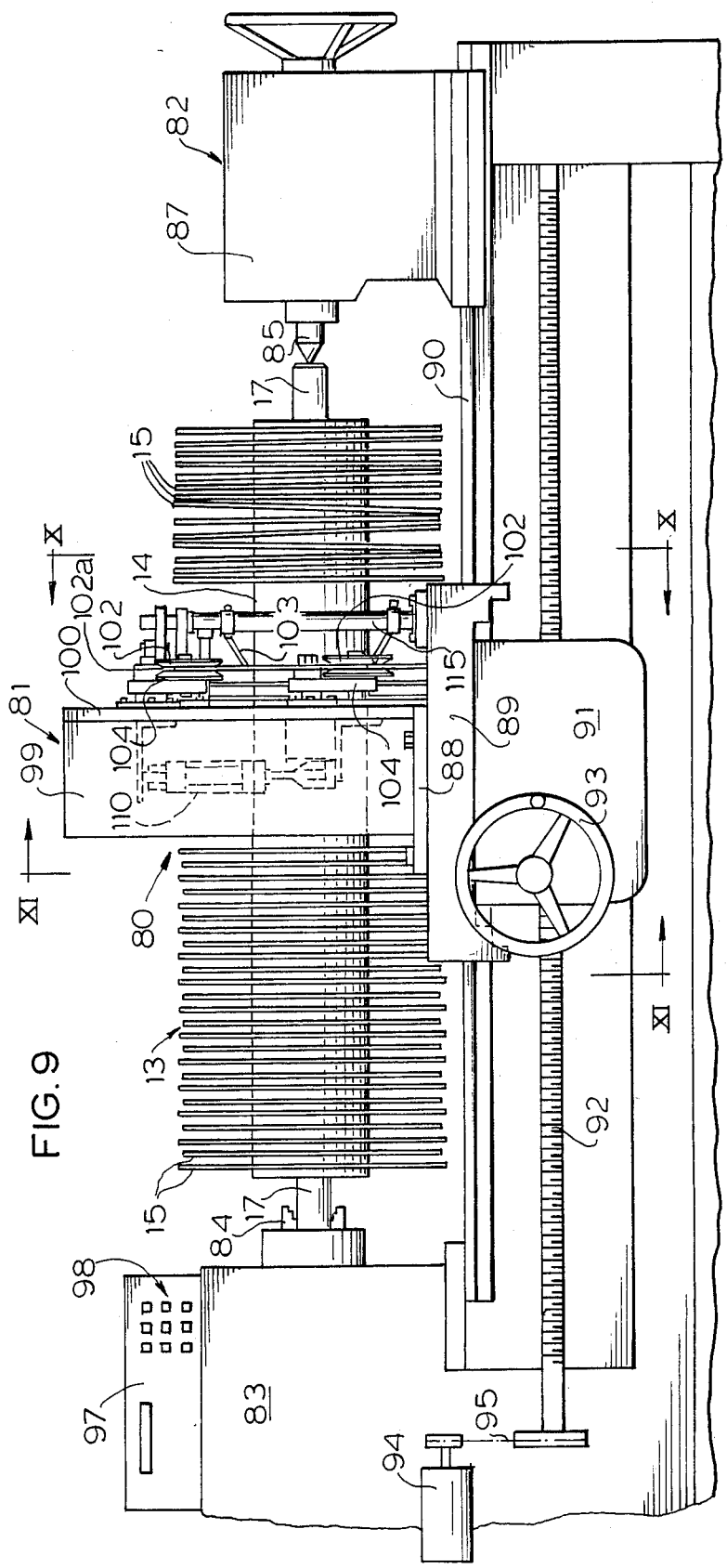
FIG. 9 is a side elevational view of a horizontal disk screen shaft assembling and welding apparatus embodying the invention.
Figure 10:
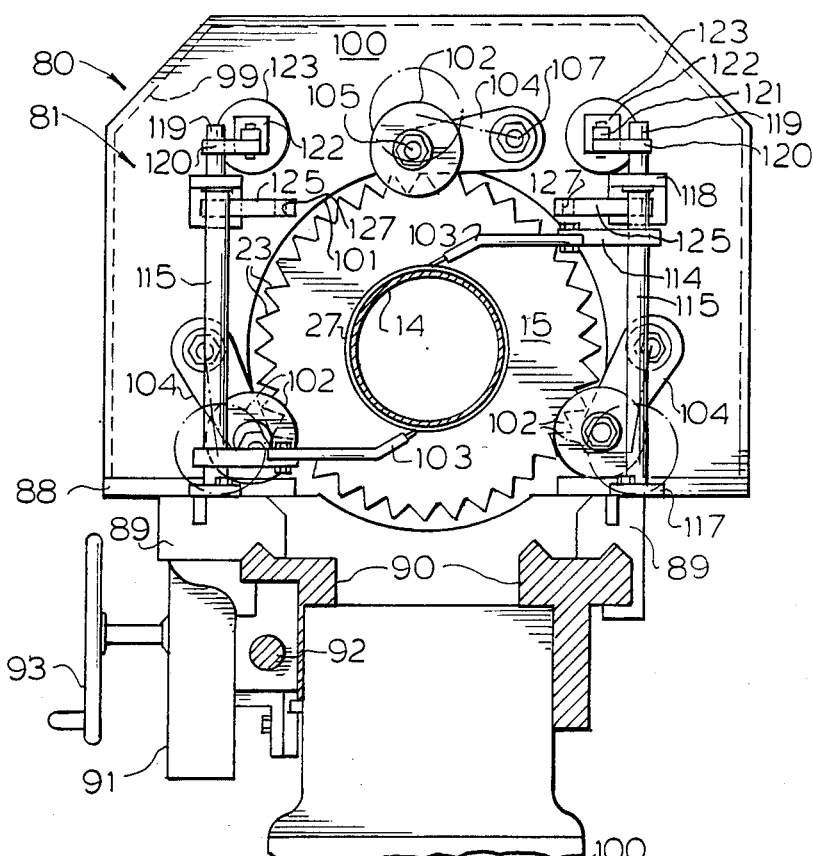
FIG. 10 is a vertical transverse sectional elevational view taken substantially along the line X—X in FIG. 9.

At the beginning of a disk welding operation, the shaft 14 with the disks 15 loosely engage thereon adjacent its end engaged by the tailstock 85, is mounted in the lathe and with the fixture 81 located at the starting end of its operating traverse, that is at the left hand end of the assembly, as viewed in FIG. 9 adjacent to the headstock 83. Then the nearest of the loosely supported disk 15 is brought into position where it is adapted to be engaged by a set of circumferentially spaced identical grooved indexing rollers 102 located at about 120° spaced intervals about the clearance opening 101 and operatively mounted on the plate 100. The rollers 102 function to hold each successive disk 15 in an accurate plane radial to the shaft 14 while the disk 15 is being welded to the shaft 14 by means of welding heads 103 carried by the fixture 81.

Figure 11:
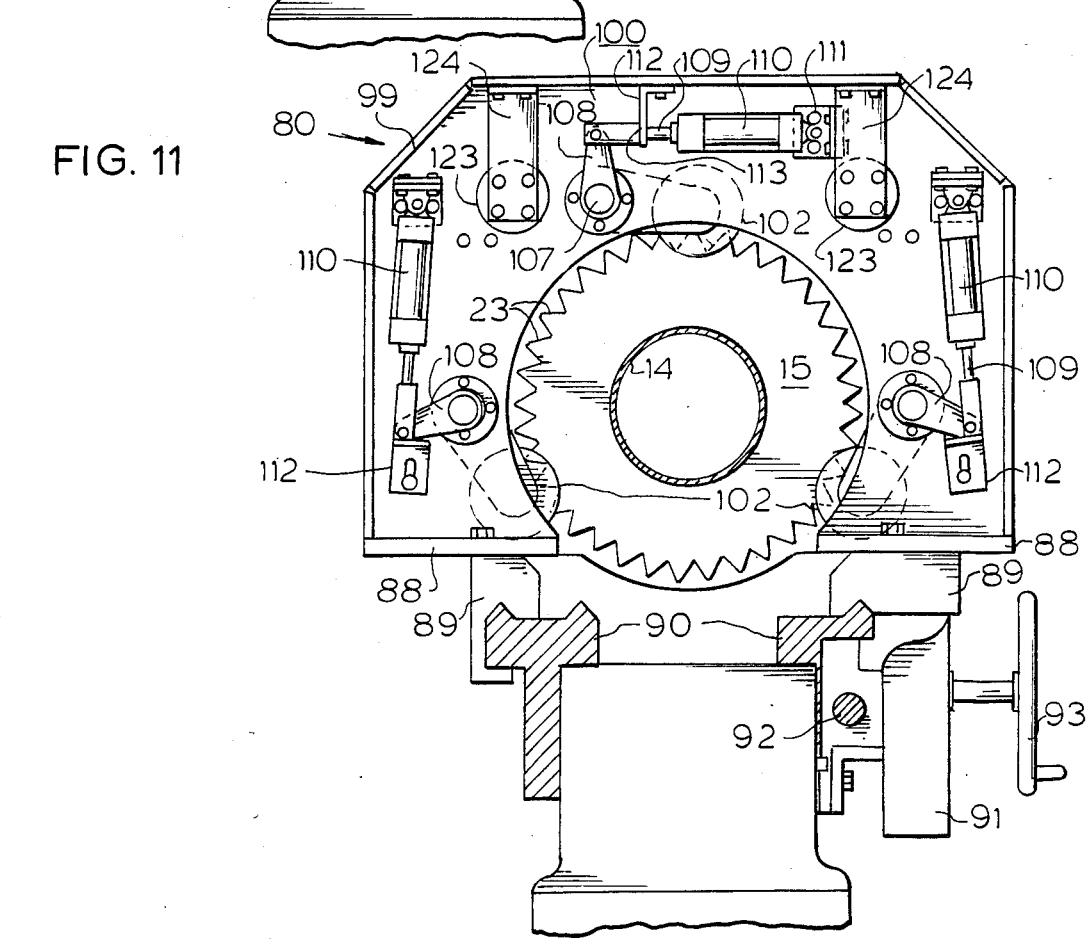
FIG. 11 is a vertical transverse sectional elevational view taken substantially along the line XI—XI in FIG. 9.

Cooperative mounting and operation of the indexing rollers 102 is effected by means of mechanism which may be identical for each of the rollers and comprises for each of them a rocker arm 104 to a distal end portion of which the associated roller is freely rotatably mounted as by means of a stub shaft journal 105. At its opposite, distal end portion, the arm 104 is fixedly secured to one end of a shaft 107 freely rotatably mounted to the mounting plate 100 by extending through a bearing 107 carried by the plate. At the inner side of the plate 100 relative to the frame 99, as best seen in FIG. 11, the shaft 107 has fixedly attached thereto an arm 108 pivotally attached to a piston rod 109 of a direct acting pneumatic cylinder actuator 110 which at its base end is pivotally attached to a bracket 111 secured to the plate 100. Thus, by operation of the actuator 110, the associated roller 102 is adapted to be moved between disk indexing position as shown in full outline in FIG. 10 and dash outline in FIG. 11 and a retracted clearance position as indicated in dot dash outline in FIG. 10.

In order to accommodate the teeth 23 of the disk 15, the rollers 102 have annular slots 102a deep enough to accommodate the teeth and engage slidably with the sides of the disks, without engagement of the teeth with the hub of the roller. To assure this indexing relationship, stop means 112 are provided for each of the roller actuating mechanisms to limit the reception of the tooth margin of the disk to the desired depth in the indexing slot 102a. For each of the two rollers 102 located near the fixture base 88, the stop 112 is mounted on the inside face of the plate 100 and is arranged to be engaged, at the end of the indexing stroke for the associated roller 102, by the outer end of the extended piston rod 109 of the actuator. For space limitation reasons, the actuator 110 for the upper of the rollers 102 may, as shown be in the retracted condition of the piston rod 109 for the indexing relationship of the associated roller 102; and for retracting the roller 102 the piston rod of the actuator 110 for that roller is protracted. Therefore, the stop 112 for the uppermost roller operating mechanism is mounted to depend from the top portion of the frame 99 to be engaged by a stop shoulder 113 on the piston rod 109 of the associated actuator 110 in the indexing orientation of the associated roller 102. It may be observed that each of the stop members 112 is adapted to be adjusted for optimum stopping function in respect to the associated roller.

Each of the welding heads 103 is mounted for swinging into and out of welding position relative to the disks 15 to be welded. For this purpose, each of the welding heads 103 is mounted on a carrying arm 114 mounted fixedly to a vertical rotary shaft 115 and journalled at its lower end in bearing means 117 mounted on top of the carriage structure 89. One of the shafts 115 is mounted at each side of and clear of the clearance aperture 101 in the plate 100. At its upper end each of the shafts 115 is journalled in a bracket 118 fixedly secured to the plate 100 and with an upper terminal end portion 119 of the shaft projecting above the bracket. Fixedly secured to the terminal portion 119 is a crank arm 120 which is pivotally attached to the outer end of a piston rod 121 of a direct acting pneumatic actuator 122 extending through a clearance aperture 123 in the plate 101, with the opposite end of the actuator pivotally attached to a bracket 124 fixedly attached to and depending from the top of the frame 99. Through this arrangement, each of the welding heads 103 is adapted to be swung, by actuation of its actuator 122, between the welding mode (full line FIGS. 9, 10 and 12) and the clearance mode (dash line FIG. 12). For assuring that the welding heads 103 will be properly oriented for welding in the welding mode, each of the shaft 115 carries a stop arm 125 (FIG. 10) which is engageable with a stop shoulder member 127 carried by the plate 100, as best seen in FIG. 12.

At the beginning of a cycle of operation of the apparatus 80, the fixture 81 has been traversed as by means of the traversing mechanism hand wheel 93 to starting position adjacent to the headstock 83. At this time the full complement of the disks 15 will have been assembled on the shaft 14 crowded toward the tailstock end of the shaft 14. Also, the indexing rollers 102 and the welding heads 103 will be in their backed-off clearance positions. The indexing rollers 102 will be aligned with the position on the headstock end of the shaft 114 at which the first in the series of disks 15 is to be welded to the shaft 14. Then the first to be welded disks 15 is maneuvered, in this instance manually, into alignment with the indexing rollers 102 which, as best seen in FIG.

Figure 13:
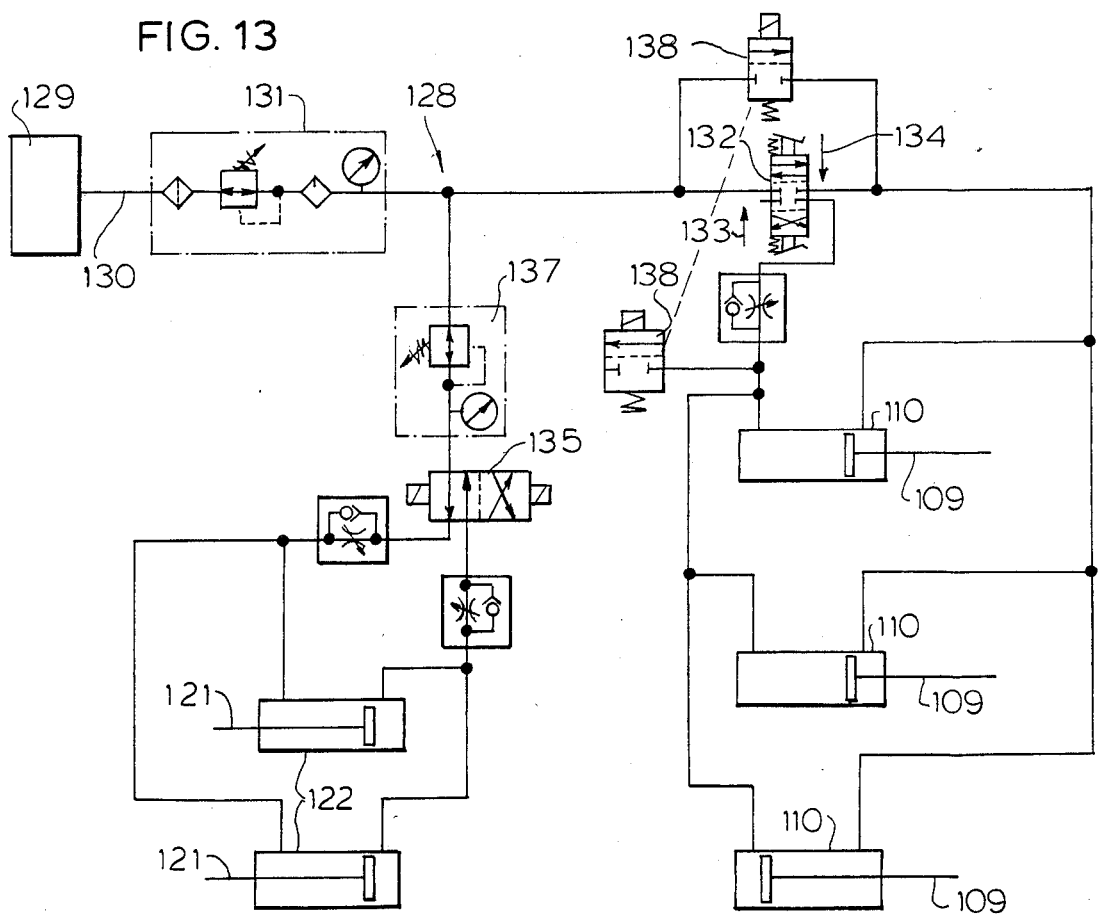
FIG. 13 is a diagramatic illustration of a pneumatic control system for the apparatus of FIG. 9.

9 have the mouth portions of the annular indexing slots 102a thereof flared to guide the disk margin into the indexing slots. For moving the indexing rollers 102 and the welding heads from their retracted positions into their indexing positions, a pneumatic system 128 diagramatically illustrated in FIG. 13 is operated. This system derives compressed air from a source 129 through a line 130 and then through a filter and gauge device 131 at suitable pressure such as 80 psig. When the operator is ready for disk indexing, he depresses a foot treadle of a normally neutral double acting valve 132 in the direction of the arrow 133 whereby the actuators 110 are energized for driving the rollers 102 into their cooperative indexing positions. The operator then releases the foot operated valve which returns to the neutral holding position. If for any reason the operator wishes to operate the indexing rollers 102, he operates the treadle valve 132 in the opposite direction as indicated by the arrow 134.

Figure 12:
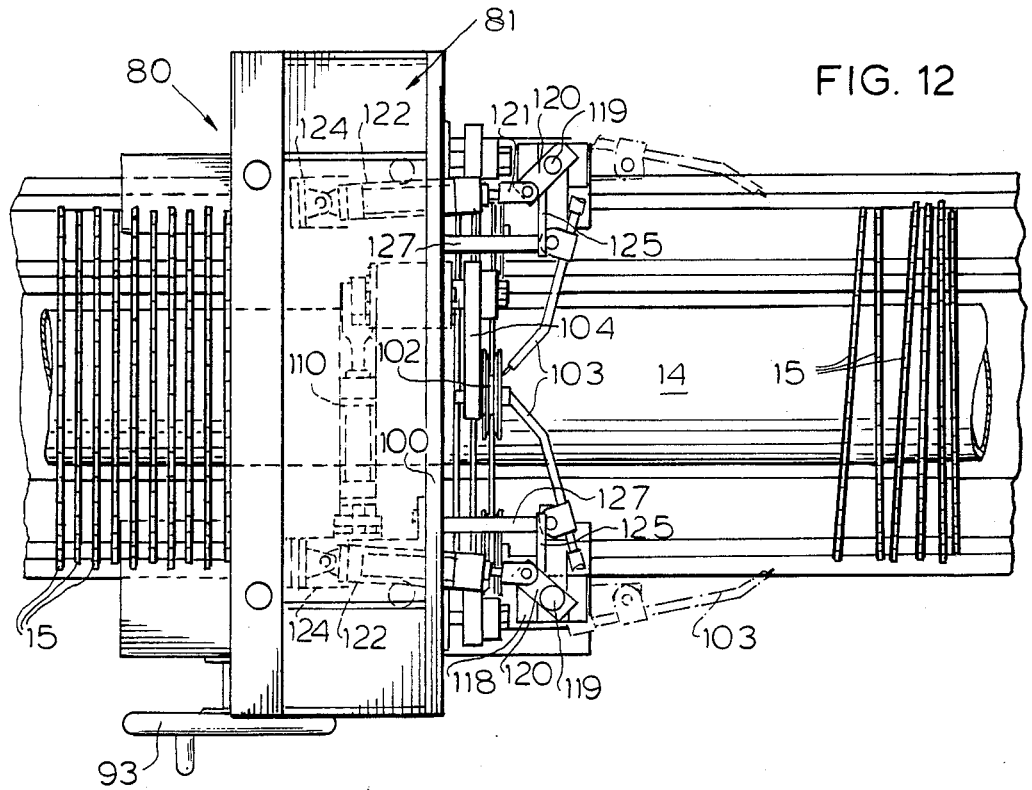
FIG. 12 is a top plan view of the apparatus of FIG. 9.

Assuming that the disk 15 to be welded is indexed by the rollers 102 to the operator's satisfaction, the operator manipulates a control element at the control board 98 to initiate an automatic sequence of actions through the controller 97, and which include operation of a solenoid valve 135 which is connected through a pressure regulating and reducing device 137 with the pressure line 130, thus causing the welding heads 103 to swing from the clearance position shown in dash outline in FIG. 12 to the welding position shown in full outline. The welding heads are automatically operated to tack weld the disk 15 in welding position by spot welding substantially diametrically opposite spots on the disk 15 within the inner peripheral groove 27 to the shaft 14. Then the lathe 82 is actuated for rotating the shaft 14 and the tack welded disk 15 at a steady relatively slow rotary speed. As the shaft and disk rotate the indexing rollers 102 continue their indexing function, rotating freely as the engaged disk 15 rotates, and the welding heads 103 are controlled to discontinue welding after the tack welds for a short distance, and then operated to weld for a substantial rotary distance, then controlled to discontinue welding for a short distance, and finally operated to resume welding for a substantial distance. On reaching the tack weld area the welding heads 103 discontinue the welding. Thus, in a preferred arrangement the welding mode will continue uninterruptedly throughout the cycle, with three major arcs of the inner or hub periphery of the disk 15 welded to the shaft 14 and interrupted at three short intervals by no welding. Of course, this sequence may be altered if preferred with different shaft and/or disk arrangement or may even be a continuous weld if preferred. However, short no weld intervals uniformly interspersed between relatively long weld sectors has been found advantageous in avoiding warping.

In the automatic cycling mode, as the welding phase is completed, the solenoid valve 135 is automatically operated to reverse the welding head actuators 122, causing the welding heads 103 to swing to the nonoperating clearance position shown in dash outline in FIG. 12. Concurrently a two way solenoid valve 138 is operated for bypassing the treadle valves 132 to effect reversal of the indexing wheel or roller actuators 110 for retracting the indexing rollers 102. This clears the welded disk 15 and in the automatic operating mode the stepping motor 94 is caused to operate for rotating the lead screw 92 for advancing the fixture 81 by one disk space increment along the shaft 14. Thereupon the next succeeding disk 15 may be moved into position to be welded, and the roller indexing and welding phases proceed automatically. For fully automatic operation, the two way solenoid valve 138 may be controlled by a timer which will allow a suitable time interval for manual placement of the next succeeding disk 15 in the welding position. If for any reason that time interval is insufficient or the operator wishes to accelerate the indexing operation, he may operate the foot pedal operated valve 132. It will be understood, of course, that at the control panel 98 there may be various manual control buttons or knobs such as for operation start, for selective on off control, for controlling shaft rotation, for welder jogging, for sequencing control, for initiating automatic operation of the indexing rollers, and the like. In any event, successive welding of the disks 15 to the shaft 14 continues until all of the disks have been accurately welded in place on the shaft. Thereupon the fixture 81 is returned to its starting position adjacent to the headstock 83, the welded shaft assembly 13 is removed, and a succeeding shaft 14 and its complement of loosely supported disks 15 to be welded thereto is mounted in the lathe 82, and the welding operation is repeated.

Where, instead of welding the disk 15 to a one piece shaft such as the shaft 14, it is desired to weld the disk to shorter module hub or shaft sections such as the shaft sections 14a (FIG. 2), a full length core shaft such as the shaft 14' in FIG. 2 may be mounted in the lathe 82 and the sections 14a mounted on the core shaft in end-to-end relation. Welding of the disks 15 may then proceed in the manner already described for a full length shaft. The spacing between welded disks will thus be maintained throughout the extent of the module shaft sections, so that when the module shaft sections are mounted for use on a core shaft in the disk screen apparatus, there will be proper interdigitation of the disk screens of contiguous disk screen shaft assemblies in the screening bed of the disk screen apparatus.

It will be understood that variations and modifications may be effected without departing from the spirit and scope of the novel concepts of this invention.

I claim as my invention:

1. A disk screen shaft assembly having shaft means with a cylindrical perimeter and an array of concentric annular toothed disks mounted in axially spaced relation on and along said shaft means perimeter, and comprising:
    said disks having axially facing surfaces and central shaft-receiving openings defined by annular bevelled edges engaged about said shaft means perimeter;
    each of said annular bevelled edges having a small diameter runout at one of said axially facing surfaces and a larger diameter runout at the other of said axially facing surfaces;
    said bevelled edges providing with said shaft means perimeter respective annular grooves; and
    welding securing said bevelled edges to said shaft means perimeter, and essentially confined to said grooves and free from said disk surfaces;
    said smaller diameter runouts being disposed so close to said shaft means perimeter that said welding is confined solely by said smaller diameter runouts against running over onto said shaft means adjacent to said one axially facing surface of each of said disks.

2. A disk screen shaft assembly according to claim 1, wherein said annular bevelled edges are on a projected conical angle of about 100° so that taken at any point along the bevel, the bevel angle is about 50°.

3. A disk screen shaft assembly according to claim 1, wherein said welding comprises a plurality of preliminary circumferentially spaced tack welds, and a plurality of circumferentially spaced final welds of substantial but limited length.

4. A disk screen shaft assembly according to claim 3, wherein said tack welds are located at diametrically opposite sides of said bevelled edges and cylindrical perimeter, and said final welds are located at 90° intervals about said perimeter.

5. A disk screen shaft assembly having shaft means with a cylindrical perimeter and an array of concentric annular toothed disks mounted in axially spaced relation on and along said shaft means perimeter, and comprising:
  said disks having axially facing surfaces and central shaft-receiving openings defined by annular bevelled edges engaged about said shaft means perimeter;
  said bevelled edges providing with said shaft means perimeter respective annular grooves; and
  welding securing said bevelled edges to said shaft means perimeter, and essentially confined to said grooves and free from said disk surfaces;
  said welding comprising a plurality of preliminary circumferentially spaced tack welds, and a plurality of circumferentially spaced final welds of substantial but limited length.

6. A disk screen shaft assembly according to claim 5, wherein said tack welds are located at diametrically opposite sides of said bevelled edges and cylindrical perimeter, and said final welds are located at 90° intervals about said perimeter.

7. A method of making a disk screen shaft assembly having shaft means with a cylindrical perimeter and an array of concentric annular toothed disks mounted in axially spaced relation on and along said shaft means perimeter, comprising:
  providing each of said disks with axially facing surfaces and a central shaft-receiving opening defined by an annular bevelled edge;
  forming the bevel of each of said edges with a smaller diameter runout at one surface of the disk and with a larger diameter runout at the opposite surface of the disk;
  mounting said disks in sequence on said shaft means by engaging said bevelled edges about said shaft means perimeter and defining with said shaft means perimeter and said bevelled edges respective annular grooves;
  welding said bevelled edges of the disks to said shaft means perimeter and essentially confining said welding to said grooves and free from said disk surfaces; and
  maintaining said smaller diameter runouts so close to the diameter of said shaft means perimeter that in said welding the welding material will be retained in said grooves at the contiguity of said perimeter and said smaller diameter runouts solely by said smaller diameter runouts.

8. A method according to claim 7, which comprises supporting said shaft means in a vertical position, and mounting said disks with said grooves facing upwardly, and effecting said welding in the upwardly facing grooves.

9. A method according to claim 7, which comprises in said welding initially tack welding said bevelled edges to said perimeter at a plurality of circumferentially spaced points, and then completing the welding throughout substantial length welding segments at circumferentially spaced areas about said bevelled edges and said perimeter.

10. A method according to claim 9, which comprises effecting said tack welds at diametrically opposite points, effecting two of said final welds at segmental areas spaced 180° about said perimeter and bevelled edges, and then effecting additional final welds spaced from and located at 90° intervals between said two final welds.

11. A method according to claim 7, which comprises supporting said shaft means vertically on a vertically and rotatably adjustable mandrel, adjusting the height of said shaft means to receive a first disk thereabout at a first location adjacent to the lower end of the supported shaft means, mounting said first disk about the shaft means and supporting the disk in accurate horizontal position with the bevel/perimeter groove thereof facing upwardly, effecting said welding at two diametrically opposite segmental areas by means of welding heads located at diametrically opposite points relative to said perimeter, then turning said shaft means and said disk to present areas of said groove 90° spaced from said first welds and operating said welding heads to effect two additionally diametrically opposite welds of said bevelled edge to said perimeter, and thereafter successively depressing said mandrel by predetermined disk spacing intervals and repeating the four-area welding of each of the successive disks until a predetermined number of disks have been welded onto said shaft means.

12. A method according to claim 7, which comprises supporting said shaft means in a horizontal welding position and extending through an indexing and welding fixture, effecting rotation of said shaft means relative to said fixture, locating said fixture at successive welding intervals along said shaft means equal to the desired disk spacing along the shaft means, at each of said intervals operating means on said fixture for accurately indexing a disk at that interval, operating welding means carried by the fixture for welding the indexed disk to the shaft means, backing off the indexing means and the welding means from the welded disk, and advancing the fixture step by step and at each step effecting indexing and welding of a disk with respect to the shaft means until a full set of disks has been welded to the shaft means.

13. A method of making a disk screen shaft assembly having shaft means with a cylindrical perimeter and an array of concentric annular toothed disks mounted in axially spaced relation on and along said shaft means perimeter, comprising:
  providing each of said disks with axially facing surfaces and a central shaft-receiving opening defined by an annular bevelled edge,
  mounting said disks in sequence on said shaft means by engaging said bevelled edges about said shaft means perimeter and defining with said shaft means perimeter and said bevelled edges respective annular grooves;
  welding said bevelled edges of the disks to said shaft means perimeter and essentially confining said welding to said grooves and free from said disk surfaces; and in said welding initially tack welding said bevelled edges to said perimeter at a plurality of circumferentially spaced points, and then completing the welding throughout substantial length welding segments at circumferentially spaced areas about said bevelled edges and said perimeter.

14. A method according to claim 13, which comprises effecting said tack welds at diametrically opposite points, effecting a first two of said final welds at segmental areas spaced 180° about said perimeter and bevelled edges, and then effecting additional final welds spaced from and located at 90° intervals between said first two final welds.

15. A method of making a disk screen shaft assembly having shaft means with a cylindrical perimeter and an array of concentric annular toothed disks mounted in axially spaced relation on and along said shaft means perimeter, comprising:

providing said disks with axially facing surfaces and central shaft-receiving openings defined by annular bevelled edges, mounting said disks in sequence on said shaft means by engaging said bevelled edges about said shaft means perimeter and defining with said shaft means perimeter and said bevelled edges respective annular grooves, and welding said bevelled edges of the disks to said shaft means perimeter and essentially confining said welding to said grooves and free from said disk surfaces; and including, supporting said shaft means vertically on a vertically and rotatably adjustable mandrel, adjusting the height of said shaft means to receive a first disk thereabout at a first location adjacent to the lower end of the supported shaft means, mounting said first disk about the shaft means and supporting the disk in accurate horizontal position with the bevel/perimeter groove thereof facing upwardly, effecting said welding at two diametrically opposite segmental areas by means of welding heads located at diametrically opposite points relative to said perimeter, then turning said shaft means and said disk to present areas of said groove 90° spaced from said first welds and operating said welding heads to effect two additional diametrically opposite welds of said bevelled edge to said perimeter, and thereafter successively depressing said mandrel by predetermined disk spacing intervals and repeating the four-area welding of each of the successive disks until a predetermined number of disks have been welded onto said shaft means.

16. A method of making a disk screen shaft assembly having shaft means with a cylindrical perimeter and an array of concentric annular toothed disks mounted in axially spaced relation on and along said shaft means perimeter, comprising:

providing said disks with axially facing surfaces and central shaft-receiving openings defined by annular bevelled edges, mounting said disks in sequence on said shaft means by engaging said bevelled edges about said shaft means perimeter and defining with said shaft means perimeter and said bevelled edges respective annular grooves, and welding said bevelled edges of the disks to said shaft means perimeter and essentially confining said welding to said grooves and free from said disk surfaces; and including, supporting said shaft means in a horizontal welding position and extending through an indexing and welding fixture, effecting rotation of said shaft means relative to said fixture, locating said fixture at successive welding intervals along said shaft means equal to the desired disk spacing along the shaft means, at each of said intervals operating means on said fixture for accurately indexing a disk at that interval, operating welding means carried by the fixture for welding the indexed disk to the shaft means, backing off the indexing means and the welding means from the welded disk, and advancing the fixture step-by-step and at each step effecting indexing and welding of a disk with respect to the shaft means until a full set of disks has been welded to the shaft means.

17. Apparatus for making a disk screen shaft assembly having shaft means with a cylindrical perimeter and an array of concentric annular toothed disks mounted in axially spaced relation on and along said shaft means perimeter, comprising:

means for supporting said shaft means in a position to receive said disks successively and with bevelled edges of the disks engaged about said shaft means perimeter and providing with said perimeter welding grooves, means for indexing the successive disks in spaced relation to one another along said shaft means perimeter, and means for welding said bevelled edges of the successive disks to said shaft means perimeter within said grooves; and said means for supporting said shaft means comprising a rotary mandrel, vertically adjustable means supporting said mandrel, said means for supporting the successive disks comprising a plurality of circumferentially spaced selectively operable disk supporting elements, said welding means comprising circumferentially spaced welding heads, and means for effecting and coordinating operation of said mandrel, said disk supporting means and said welding heads.

18. Apparatus according to claim 17, including a stand supporting a vertical guide structure, vertically reciprocative platform means guided for vertical movement by said guide structure, a ground ball screw for effecting vertical adjustments of said platform means, a stepping motor for operating said screw, a vertical hub mounted on said platform means and projecting upwardly therefrom, a rotary mandrel mounted on and about said hub and adapted to be received in a hollow tubular shaft means, means for securing the shaft means corotatively with said mandrel, means for rotating said mandrel, disk supporting fingers having fluid operated cylinder actuators mounted above said guide structure and adapted to be moved into and out of disk supporting positions, welding heads having fluid operated cylinder actuators mounted above said guide structure, and means for coordinating operation of said screw operating stepping motor, said mandrel rotating means, and said actuators for effecting successive disk position indexing of said platform and said mandrel and said heads for welding of said disks to said shaft means.

19. Apparatus for making a disk screen shaft assembly having shaft means with a cylindrical perimeter and an array of concentric annular toothed disks mounted in axially spaced relation on and along said shaft means perimeter, comprising:

means for supporting said shaft means in a position to receive said disks successively and with bevelled edges of the disks engaged about said shaft means perimeter and providing with said perimeter welding grooves, means for indexing the successive disks in spaced relation to one another along said shaft means perimeter, and means for welding said bevelled edges of the successive disks to said shaft means perimeter within said grooves;

said supporting means supporting said shaft means in a horizontal position, means for rotating said shaft means as thus supported, an indexing and welding fixture through which said shaft means extends, means for indexably moving said fixture by disk space increments along said shaft means, said shaft means being adapted to support a loose array of said disks for successive welding to said shaft means, said indexing means being carried by said fixture, and means for cyclically advancing and indexing said carriage and for cyclically operating said disk indexing means and said welding means.

* * * * *